United States Patent [19]

Schleupen

[11] 4,430,709
[45] Feb. 7, 1984

[54] APPARATUS FOR SAFEGUARDING DATA ENTERED INTO A MICROPROCESSOR

[75] Inventor: Richard Schleupen, Ingersheim, Fed. Rep. of Germany

[73] Assignee: Robert Bosch GmbH, Stuttgart, Fed. Rep. of Germany

[21] Appl. No.: 281,170

[22] Filed: Jul. 7, 1981

[30] Foreign Application Priority Data

Sep. 13, 1980 [DE] Fed. Rep. of Germany ....... 3034581

[51] Int. Cl.³ .............................................. G06F 7/00
[52] U.S. Cl. .................................................. 364/200
[58] Field of Search .................. 364/900, 200; 365/94, 365/104, 189

[56] References Cited

U.S. PATENT DOCUMENTS

| | | | |
|---|---|---|---|
| 4,183,085 | 1/1980 | Roberts et al. | 364/200 |
| 4,268,911 | 5/1981 | Bell | 365/104 |
| 4,298,934 | 11/1981 | Fischer | 364/200 |
| 4,332,009 | 5/1982 | Gerson | 364/200 |

FOREIGN PATENT DOCUMENTS 2401459 3/1979 France .

OTHER PUBLICATIONS

Gibson; G. A., Liu; Y., *Microcomputers for Engineers and Scientists*, Prentice-Hall, Inc., 1980.
Abd-alla; A. M., Meltzer; A. C., *Principles of Digital Computer Design*, Prentice-Hall, 1976.

*Primary Examiner*—Jerry Smith
*Assistant Examiner*—Michael R. Fleming
*Attorney, Agent, or Firm*—Frishauf, Holtz, Goodman & Woodward

[57] ABSTRACT

For any given program entered into an EPROM in a microprocessor, read-out from certain storage locations or cells in the EPROM is prevented by transmission gates connected into externally accessible data lines. Transmission through the transmission gates is blocked by the arithmetic unit when a blocking command is present in one or more cells of the EPROM. These commands are only entered into the EPROM after all information required for the program is stored in the latter and, if necessary, the unit has been tested for proper operation. When the program is erased, the blocking commands are also erased so that the chip is available for another application.

4 Claims, 2 Drawing Figures

APPARATUS FOR SAFEGUARDING DATA ENTERED INTO A MICROPROCESSOR

The present invention relates to arrangements for safeguarding data entered into a microprocessor.

BACKGROUND

In presently known microprocessors and, more particularly, in single chip microprocessors, data entered therein is safeguarded by physically breaking the data bus lines which are externally accessible and which are no longer required for further data input. Such a physical interruption of the data bus lines is extremely difficult to carry out, particularly in the case of encapsulated chips. Diamond drills are required for this purpose. These drill through the chip at the corresponding location so that the output lines are broken. A microprocessor which has been treated in this manner cannot be re-used for a different purpose.

THE INVENTION

It is an object of the present invention to furnish a non-volatile memory unit such as a safeguard for data entered into a programmable read-only memory (PROM) of a single-chip microprocessor which does not involve a physical cutting of the externally accessible data lines, and which permits re-use of the chip for a different program after the then-present program has been erased.

In accordance with the invention, a transmission gate is inserted into an externally accessible line between the arithmethic unit and the non volatile memory, typically a PROM of the chip through which the data transmission is to be interrupted once the complete program has been stored in the memory. Transmission through the transmission gate and thereby through the line into which it is inserted can be interrupted by application of a transmission control signal to the gate, which thereby controls the gate to blocked condition. Since the gate is part of a Programmable Read-Only Memory, its setting to blocked condition then can no longer be changed-unless the entire memory is of the Erasable Programmable Read-Only Memory type (EPROM). The control input of the transmission gate which "programs" the gate is connected to the arithmetic unit. Specifically, the arithmetic unit furnishes the transmission control signal which blocks transmission through the line when data stored in a particular storage location in the memory indicates that program storage has been completed, and if necessary, the correct operation of the unit has been checked. This transmission control signal thus "programs" the gate to "blocked" or "inhibit" state and, since it is a PROM, the stored program of the gate is a permanent "blocked" or "inhibit" condition, preventing read-out of the other contents of the PROM.

Of course, transmission gates can be inserted into selected ones or all of the externally accessible data lines. The transmission gates can all be operable in response to a single transmission control signal or, for additional flexibility, data can be entered into different storage locations which, in turn, control different ones of the transmission gates via the arithmetic unit. Of course, it should be noted that once transmission through a particular line has been stopped in this manner, no further use of this line is possible until the whole program has been erased.

Erasable Programmable Read-Only Memories, i.e. EPROMs are particularly suitable for use as storages for the above-described apparatus. After the program has been entered into a PROM and has been tested, a further command can be entered which blocks all or part of the externally accessible data bus lines. If the chip is an EPROM, it can be used for another purpose, since the EPROM may be erased, thereby also erasing the transmission control command which causes the data bus lines to be blocked.

AND gates are suitable for use as transmission gates.

DRAWINGS ILLUSTRATION A PREFERRED EMBODIMENT

FIG. 1 illustrates the general construction of a single chip microprocessor; and FIG. 2 illustrates the externally accessible data lines with the transmission gates according to the present invention.

DESCRIPTION OF THE PREFERRED EMBODIMENT

Figure 1:
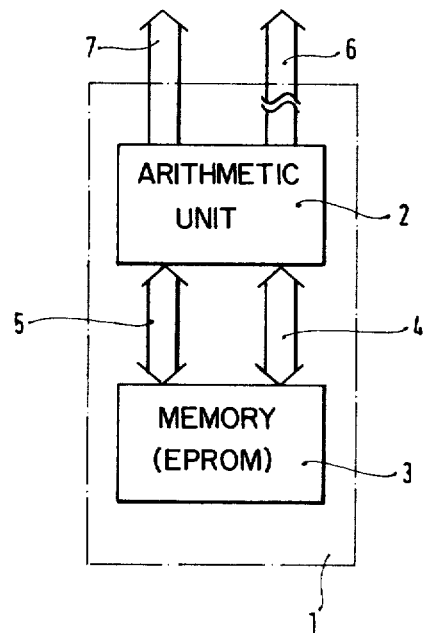

In FIG. 1, a housing 1 houses an arithmetic unit 2 and at least one memory 3. Memory 3 has a plurality of storage locations. Arithmetic unit 2 is connected to memory 3 by a first set of data bus lines 4 and an address bus 5, neither of these being externally accessible. A second set of data bus lines 6, which are externally accessible data bus lines 6, are connected to the output of arithmetic unit 2. Further connected to arithmetic unit 2 is a set of input-output lines 7.

Memory 3 may contain a permanent memory, that is, a non-volatile memory typically having read-only memory cells and variable memory cells or it may contain permanent read-only cells, that is, non-volatile cells only. Data in the storage locations of memory 3 are addressed through address bus 5 and are applied to arithmetic unit 2 via data bus 4. As mentioned previously, data bus 4 and data bus 5 are not externally accessible. As soon as data has been read into memory 3, the unit is tested for proper operation of the memory 3 and the arithmetic unit 2. For this purpose, suitable apparatus is connected to input-output lines 7 and data is read out through data bus lines 6. For many applications, it is desired to block the output from data bus lines 6 after it has been found that the unit has been operating properly. This blocking is possible because all constantly changing quantities may be applied to and read out from the arithmetic unit via input-output lines 7. In order to prevent fixed data stored in memory 3 from being read out via data bus lines 6, so that their content no longer would be safeguarded, it is necessary to block these lines. This is particularly simple when all or at least part of memory 3 is an EPROM. Specifically, after the unit has been tested and found to be operating properly, a blocking command is entered into a further storage cell in the EPROM. As previously mentioned, the blocking command means that one or more of data bus lines 6 is to be blocked. Since the blocking command is in form of program data for the EPROM, no further information can thereafter be derived via the so blocked lines.

Erasure of the information in the EPROM automatically also erases the blocking command. In other words, all information stored in the EPROM is erased simultaneously. The microprocessor chip can now be used for another purpose. The protected data, however, has been erased together with the blocking command.

Figure 2:
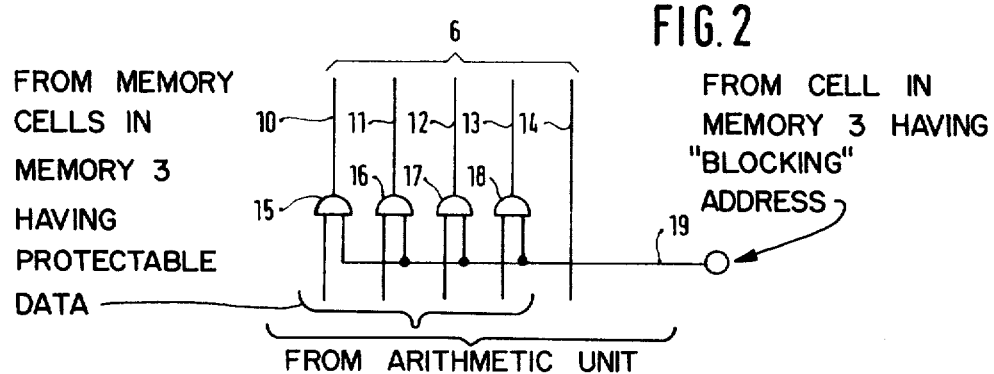

The transmission gates described above are illustrated in detail in FIG. 2. AND gates 15, 16 and 17 are inserted into data lines 10, 11, 12 and 13 of data bus 6, respectively. These lines carry the data, upon first programming and then checking, which are to be protected. Each of the AND gates has one input connected to a data line coming from the arithmetic unit, while each of the AND gates also has a second input which is connected to a line 19. The other end of line 19 is connected to arithmetic unit 2. One data bus line, 14, of data bus 6, does not contain an AND gate. When no blocking command is stored in the particular storage cell in memory 3 assigned to that purpose, line 19 carries a "1" signal. AND gates 15-18 are therefore transmissive and data can be transmitted therethrough and is available at the outputs of the chip.

Once the chip has been tested, one or more designated storage cells in memory 3 receive the blocking command signal, so that a "0" signal is applied through line 19 to AND gates 15-18. Lines 10-13 of data bus 6 are thereby blocked, while transmission of pulses through line 14 is still possible. The pulses transmitted through line 14 may, for example, be required for controlling functions in associated equipment.

As mentioned previously, the blocking inputs of the AND gates need not all be connected to one line 19. They may be connected individually to the microprocessor so that, according to a particular application, different storage cells in memory 3 can control different ones of the transmission gates. It may, for example, be acceptable that some data is transmitted through the data bus 6, as long as the so-transmitted data is too incomplete to be evaluated. Thus, some of the lines may continue to be used for processing further information.

In order to prevent external interference with the transmission gates, the latter must be integrated into housing 1 of the microprocessor. Of course, it is not necessary that AND gates be used, other logic gates such as NOR or NAND gates can be connected to function in the same manner and may constitute driving stages as well as transmission gates.

The apparatus of the present invention thus has the advantage that, for each program, the output of data whose secrecy is to be preserved can be blocked without destroying the chip for reprogramming. Further, the blocking cannot be eliminated without erasure of the complete information stored in the storage.

Various changes and modifications may be made within the scope of the inventive concepts.

I claim:

1. In a single chip microprocessor having a nonvolatile externally programmable memory unit (PROM) (3) having a plurality of storage locations; an arithmetic unit (2);

a plurality of externally accessible data bus lines (6) connected to the arithmetic unit;

a plurality of input-output lines (7) connected to the arithmetic unit, data and address bus lines (4,5) interconnecting the arithmetic unit and the memory;

the memory unit (PROM) (3) including apparatus for safeguarding data stored in the memory unit (3) and to prevent undesired read-out of said data through the externally accessible data bus lines (6), comprising at least one transmission gate (15-18) in the externally programmable memory unit (3) connected for data transmission on at least one of the data bus lines (6; 10-13) selectively permitting or blocking transmission of data through said externally accessible data bus lines (6);

one of said storage locations of the externally programmable memory unit (3) storing a blocking command;

and means (19) connected to the at least one transmission gate (15-18) for applying to said at least one transmission gate a transmission control signal from said one storage location upon addressing of said one storage location to thereby program said at least one gate to be blocked for blocking of data transmission through said at least one externally accessible data bus line (6; 1-13) to thus prevent undesired read-out of the data stored in the externally programmable memory unit.

2. Apparatus according to claim 1 wherein said nonvolatile programmable memory unit (3) is a programmable read-only memory (PROM).

3. Apparatus as set forth in claim 2, wherein said PROM is an eraseable PROM (EPROM) and at least selected ones of said plurality of storage locations together constitute the EPROM.

4. Apparatus as set forth in claim 1, wherein said at least one transmission gate is an AND gate.

* * * * *